Figure 1:
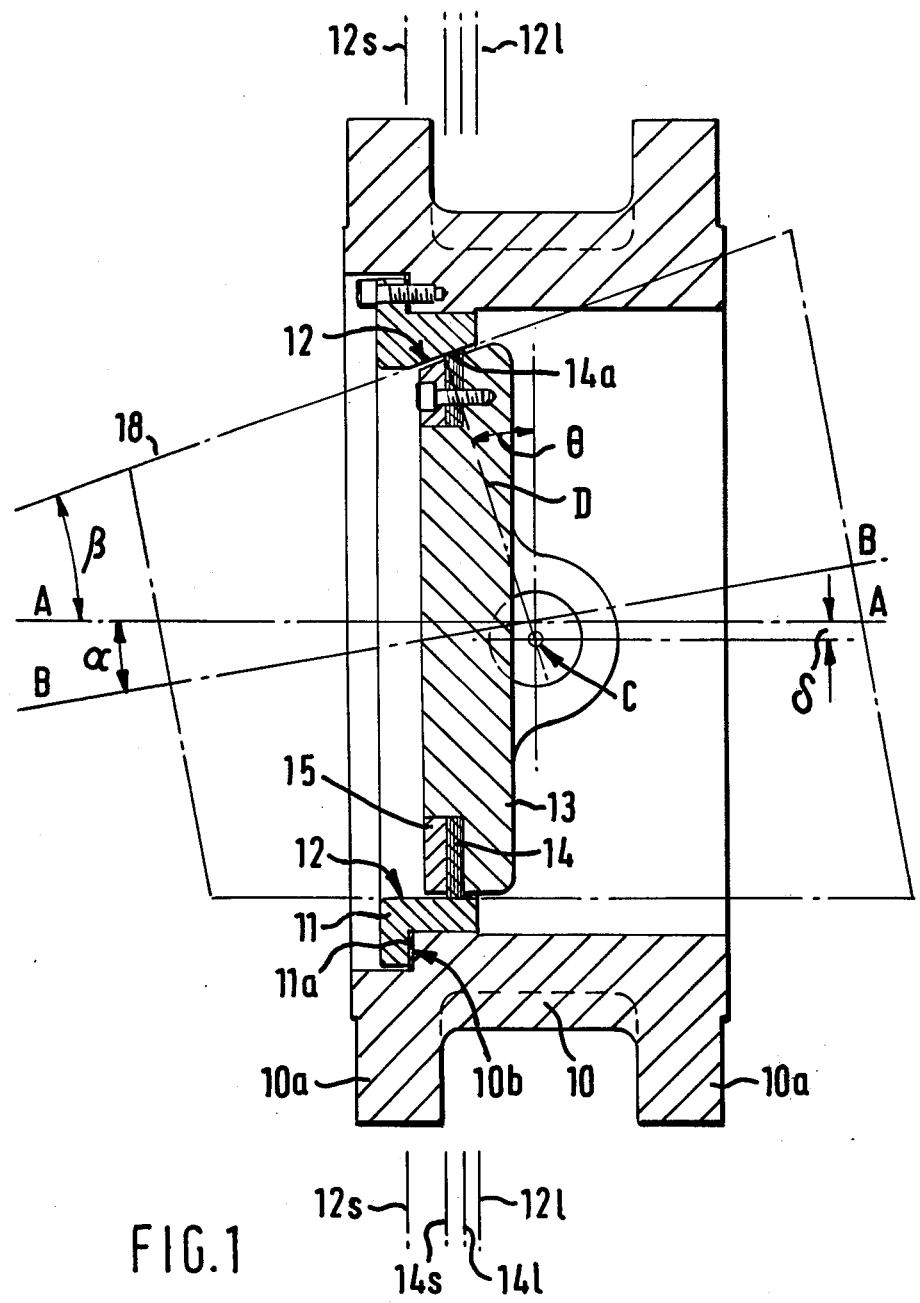

United States Patent [19]

Thurston et al.

[11] 4,265,426

[45] May 5, 1981

[54] BUTTERFLY VALVE

[75] Inventors: Victor N. Thurston, Manor Lodge; Geoffrey B. Marshall, Malwood, both of England

[73] Assignee: Solent & Pratt (Engineering) Limited, Southampton, England

[21] Appl. No.: 72,594

[22] Filed: Sep. 5, 1979

[30] Foreign Application Priority Data

Sep. 19, 1978 [GB] United Kingdom ............... 37326/78

[51] Int. Cl.³ .............................................. F16K 1/226
[52] U.S. Cl. ..................................................... 251/306
[58] Field of Search .............................. 251/305, 306

[56] References Cited

U.S. PATENT DOCUMENTS

| | | | |
|---|---|---|---|
| 1,744,798 | 1/1930 | Price | 251/305 |
| 3,442,488 | 5/1969 | Adams | 251/305 |
| 3,595,523 | 7/1971 | Felton | 251/306 |
| 3,807,690 | 4/1974 | Pfundstein | 251/306 |
| 3,931,955 | 1/1976 | Jacobs | 251/305 |
| 3,963,213 | 6/1976 | Brattberg | 251/306 |

Primary Examiner—Alan Cohan
Assistant Examiner—H. Jay Spiegel

[57] ABSTRACT

A butterfly valve has its seat formed on a detachable ring which is normal to the axis of the valve body. Both the seat and a co-operating seal on the valve disc have frusto-conical contact surfaces such that with the valve closed these surfaces are on a common cone with an axis inclined to body axis. The disc rotates about an axis offset beyond the larger ends of the contact surfaces and also offset to one side of both the body and cone axes. Operation of the valve and its maintenance are thereby improved.

3 Claims, 2 Drawing Figures

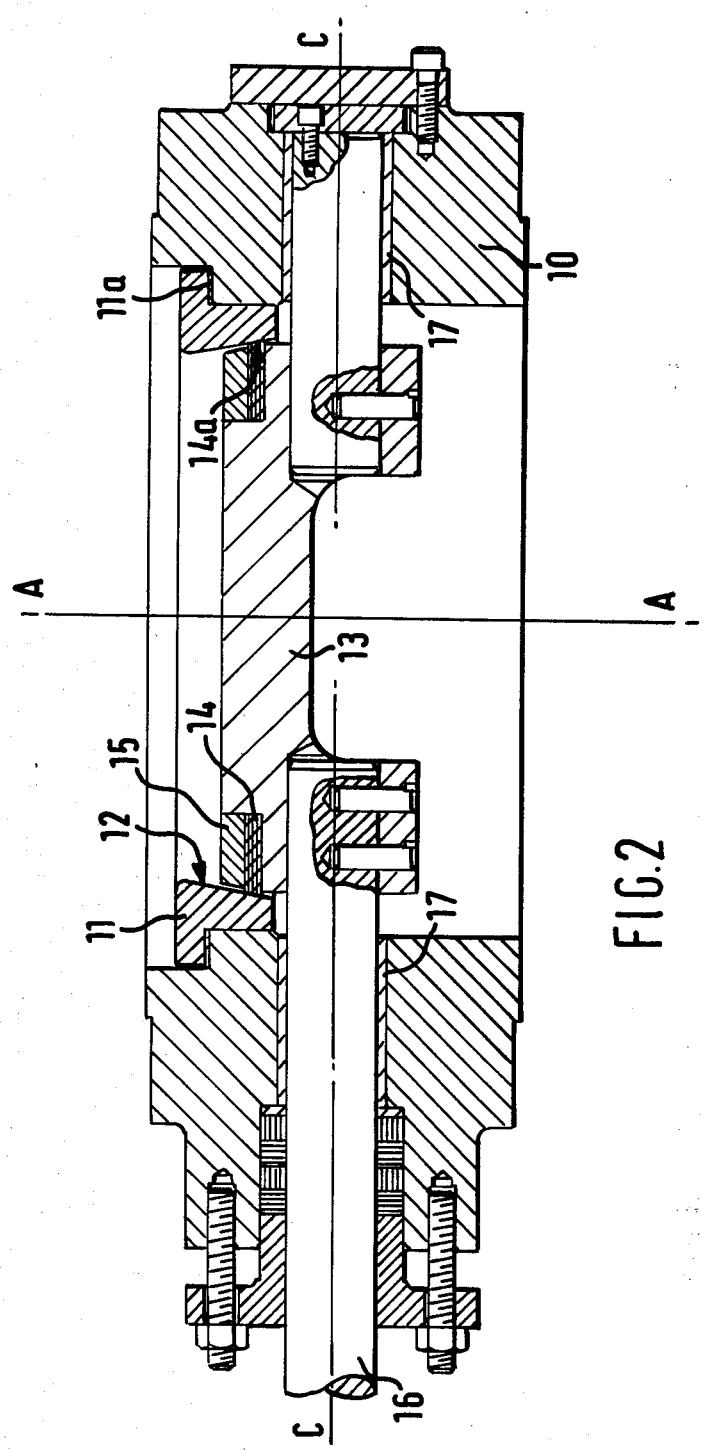

BUTTERFLY VALVE

DESCRIPTION

1. Field of Invention

This invention relates to valves, commonly known as butterfly valves. A butterfly valve basically comprises a disc carried by a rotatable spindle extending transversely across the disc so that, by rotating the spindle, the disc moves between a closed position in which the flow path through a duct, e.g. in a pipe line or valve body connectable in the pipe line, is obstructed and an open position in which the disc is more or less edge-on to the flow.

2. Description of Prior Art

In U.S. Pat. No. 3,442,488, there is described a butterfly valve comprising an elliptical ring welded in a pipe section so that the ring is in a plane oblique to the pipe axis, the ring being formed with a frusto-conical contact surface having boundary planes which are oblique both to the pipe axis and the cone axis which in turn is at an angle to the pipe axis. The valve flap or disc has a peripheral seal with a corresponding conical contact surface and the rotational axis of the spindle which carries the disc is offset from pipe and cone axes such that at the point of closure there are angular clearances between the seat and the seal surface at the positions of greatest and least distances of the contact surfaces from the rotational axis.

Such a valve is difficult to manufacture, to set up initially to ensure good closure characteristics and to maintain e.g. by replacing the seal.

SUMMARY OF THE INVENTION

In accordance with the invention, a butterfly valve comprises a body and a ring mounted for axial detachment within the valve body and providing the annular valve seat whereof the contact surface has boundary planes substantially normal to the axis of the body, the contact surfaces of the seat and peripheral seal when the valve is closed lying on a common cone whereof the axis is inclined to the axis of the valve body and the disc being mounted for rotation about an axis so offset from the boundary planes beyond the larger end of the contact surface of the seat and from the axis of the cone that, with the valve closed, a line extending from the rotational axis through the furthermost point of the smaller boundary of the seal's contact surface makes an angle to a plane normal to the body axis which is less than the angle between this axis and the generatrix of the cone through that point.

It is thus an object of the invention to provide an improved butterfly valve with frusto-conical contact surfaces which, by having the seat-forming ring in a plane normal to the body axis and axially detachable, is simple to manufacture and set up to ensure good closure characteristics, which ensures low scuffing between the seat and seal, and which is readily maintained.

In a preferred construction, the ring is bolted to an axially-facing shoulder in the valve body and a gasket of selected thickness is interposed between the ring and shoulder. Also, preferably the inclination of the cone axis to the body axis is equal to half the cone angle.

The accompanying drawings illustrate by way of example one form of butterfly valve in accordance with the invention.

In the drawings:

FIG. 1 is a section through the valve on a plane containing the axis A—A of the valve and normal to the rotational axis of the valve disc, and FIG. 2 is a section on an orthogonal plane through the valve axis.

The butterfly valve shown comprises a valve body 10 with bolting flanges 10a by which it will be connected in a pipe-line for example, and A—A is the body axis and the flow direction through it. The internal surface of the body 10 has a rebate forming a shoulder 10b against which is bolted a ring 11 having the valve seat 12 on its inner periphery. A gasket 11a is interposed between the shoulder 10b and the ring 11.

The ring 11 provides a valve seat 12 which is frusto-conical and the cone axis B—B is inclined to the axis A—A at an angle $\alpha$. In the illustrated construction the angle $\alpha$ is half the cone angle so that the generatrix of the seat 12 at the bottom of FIG. 1 is parallel to the valve axis A—A and the generatrix 18 at the top of the Figure makes an angle $\beta$ with the axis A—A equal to the cone angle. The boundary planes of the frusto-conical seat 12 are indicated by lines 12s for the smaller end and 12l for the larger end.

The valve also comprises a disc 13 having an annular seal 14 secured to its periphery by a clamping ring 15, and the disc 13 is secured on a spindle 16 (FIG. 2) rotationally mounted in bearings 17 in the wall of the valve body 10.

The boundary planes of the contact surface 14a of seal 14 are indicated at 14s and 14l for the closed condition of the valve.

The rotational axis C—C of the disc is positioned as follows:

The axis C—C is in a plane normal to the axis A—A and is offset from the planes 12s, 12l and 14s and 14l so as to be beyond the larger ends of the contact surfaces of the seat 12 and seal 14. Also as indicated by point C in FIG. 1 the axis C—C is offset from the axes A—A and B—B on the side thereof remote from the inclined generatrix 18 (FIG. 1) which is most remote from the axis C—C.

The offset is such that a line D which extends from point C to the point of intersection of the inclined generatrix 18 with the plane 14s, makes with a plane normal to the axis A—A an angle $\theta$ which is less than angle $\beta$, i.e. in this case less than the cone angle.

The seal 14 can thereby be made of a resilient or semi-resilient material since scuffing between the seal 14 and seat 12 is low.

Further the arrangement permits full opening of the valve from a closed position, in which the boundary planes 12l, 12s, 14l and 14s are substantially normal to the axis of the valve body, to an open position in which the planes 14l and 14s are substantially parallel to the axis A—A.

Also the seal 14 may be replaced without major dismantling of the valve, e.g. by removing clamping ring 15 with the disc 13 in the open position.

Again the construction permits, by selecting the thickness of the gasket 11a, the axial position of the ring 11 to be varied relatively to the disc 13 so that the sealing characteristics of the valve can be varied.

We claim:

1. A butterfly valve comprising a valve body and a ring mounted for axial detachment within the valve body and providing an annular valve seat having a contact surface, the axial limits of which are defined by boundary planes which are normal to the axis of the body, a valve disc, a peripheral seal on the disc which seal has a contact surface to co-operate with the contact surface of the seat, the contact surfaces of the seat and the peripheral seal lying, when the valve is closed, on a common cone, the axis of which cone is inclined to the axis of the valve body, at least one generatrix of the cone being parallel to the axis of the valve body, said contact surface of the seat thereby ending in said boundary planes in a larger end boundary and a smaller end boundary, the disc being mounted for rotation about an axis which is so offset from the boundary planes beyond the larger end boundary of the contact surface of the seat and from the axis of the cone that, with the valve closed, a line extending from the rotational axis through the furthermost point of the smaller end boundary of the contact surface of the seal makes an angle to a plane normal to the body axis which is less than the angle between said body axis and the generatrix of the cone through that point.

2. A butterfly valve according to claim 1 wherein the valve body has an axially-facing shoulder to which the ring is bolted and a gasket of selected thickness is interposed between the ring and shoulder.

3. A butterfly valve according to claim 1 or claim 2 wherein the inclination of the cone axis to the body axis is equal to half the cone angle.

* * * * *